Figure 1:
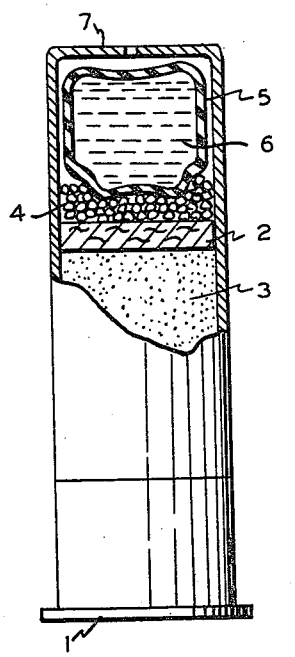

Dec. 25, 1962  M. L. SIMMONS  3,069,809

METHOD AND APPARATUS FOR HIGH PRESSURE BOTANICAL IMPREGNATION

Filed Jan. 13, 1960

INVENTOR
Milton L. Simmons

BY

ATTORNEY

United States Patent Office 3,069,809
Patented Dec. 25, 1962

3,069,809
METHOD AND APPARATUS FOR HIGH PRESSURE BOTANICAL IMPREGNATION
Milton L. Simmons, Middleburg Heights, Ohio
(8043 Amber Lane, Brecksville 41, Ohio)
Filed Jan. 13, 1960, Ser. No. 2,142
2 Claims. (Cl. 47—57.5)

This invention relates generally to the impregnation of particles of one substance into a mass of another, different substance, and more particularly to the injection, under explosive force, of fluids and solid particles into the stems, branches, leaves and roots, as well as into the root vicinity, of plants.

For numerous reasons it is frequently desirable to introduce directly into plant systems various liquid and/or solid substances.

For example: In clearing land for agricultural purposes or housing, it is very often advantageous to poison, to prevent re-sprouting of root systems and thus insure permanent removal, certain vegetation such as trees and heavy undergrowth prior to physical removal of the surface growth. Furthermore, in the field of plant nutrition, it is well known that certain nutrients are more efficiently utilized when introduced directly into the plant system. And, when internal medication is indicated, again the surest and quickest results are often achieved by direct injection into the plant.

Previous methods of poisoning by hand powered penetration and gravity injection had the disadvantages of being slow and time consuming when a large tract had to be cleared, besides having questionable penetration in the case of a tree or other plant having an extremely hard and tough outer bark or covering.

Methods used heretofore for the direct introduction of certain nutrients, such as liquid fertilizers, into plant systems required cumbersome tubing and reservoir means for storage and conveyance of the fertilizer from the reservoir to the point of introduction into the plant system. Where it was desired to introduce trace nutrients, such as iron, into trees, the method of driving a soft iron nail into the trunk has been proposed. This however has the disadvantages of being detrimental to saw mill equipment when the tree is destined to be felled for the lumber industry, besides presenting insufficient surface area to the tree's interior for realizing the required level of solubility.

In the matter of medication, such laborious methods as tapping the plant stalk, or trunk, depositing the medication, then sealing the wound, have been employed when direct infusion of the medication is indicated. For mass treatment of large tracts, this method is obviously too slow.

For bringing poisons, or beneficial substances, into the root vicinity of plants, the time honored method of simply distributing the poison or beneficial substance on the surface of the earth is frequently employed, or holes are drilled in the earth and filled with the substance to be introduced to the plant. This method has the well know drawback of being inefficient since a major part of the nutrients or poisons so introduced are leached and carried away by ground water. The roots of the larger plants such as trees, being part of a widespread and deeply growing network, thus never have the opportunity to come in contact with and acquire a major portion of nutrients or poison applied in this manner.

My novel invention, while extremely simple in principle, solves all these difficulties by quickly and effectively blasting the charge of material, to be directly introduced to the plant, with explosive force, straight into the branches, trunk, stalk, roots, or root vicinity.

It is therefore an object of this invention to inject directly into the trunk, branches, stalk, roots or root vicinity of growing plants, solid or liquid nutrients, medications or poisons.

It is also an object of this invention to provide a simple and effective means for forcing poisons into growing plant systems when their permanent removal is sought.

Other objects will hereinafter appear as the disclosure progresses.

While the prior art shows innumerable applications of explosive means for performing a number of useful tasks such as fixing industrial fasteners into wood, concrete and steel, such explosive means have apparently never been utilized for injecting forcibly into plants certain beneficial nutrients, medicaments or poisons. This may possibly be due to the fact that the anticipated damage to the plant from the explosive force of the blast would seem to outweigh the benefits to the plant when nutrients or medicaments are to be injected.

Surprisingly enough, I have found that explosive penetration through the bark or outer covering of a tree branch, for example, is possible without undue damage to the branch covering, using the methods described infra.

Figure 2:
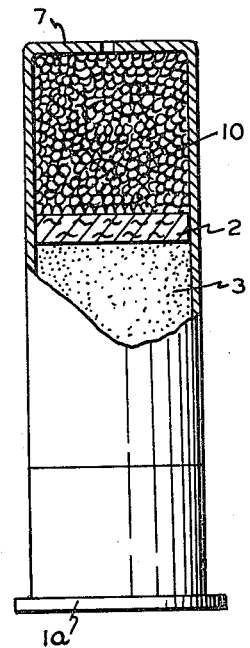
Figure 3:
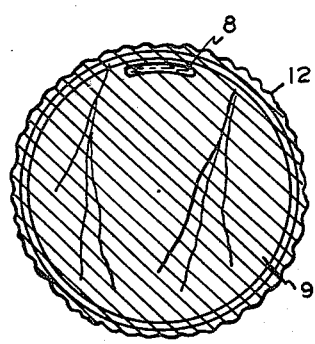
Figure 4:
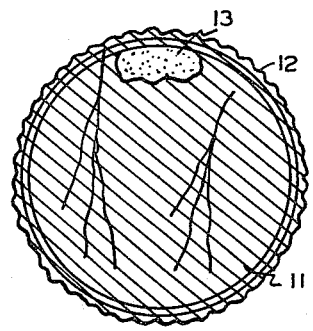

Following then by way of description, but to be considered in no way a limitation of the numerous forms which the invention may take within the scope of its obvious variations and ramifications, are examples of preferred embodiment aided by the attached drawings wherein FIGURE 1 is a section through a 12 ga. shotgun shell with a liquid charge, FIGURE 2 is a section through a 12 ga. shotgun shell with a solid charge of soluble nutrient, FIGURE 3 shows an elm branch, which has been explosively injected with a liquid charge, and FIGURE 4 shows a maple branch, freshly cut, which has been explosively impregnated with finely divided solid nutrient.

As an example of liquid impregnation utilizing explosive means, a standard shotgun shell (12 ga.) 1, designated RX12–MAG 4–1½–4 by the manufacturer, having an explosive charge of 4 gm. of smokeless powder and 1½ oz. of No. 4 shot, was opened and the shot load removed, as illutrated in FIGURE 1 attached.

The wad 2 and powder charge 3 were left intact and ¼ oz. of finely divided standard NPK fertilizer consisting of 10%–6%–4% respectively of nitrogen (N), phosphorous ($P_2O_5$), and potassium ($K_2O$), approximately 0.079 inch diameter average, as indicated by 4 in FIGURE 1, was packed immediately above the wad 2 to act as ballast to insure complete burning of the explosive charge 3. However, any finely divided, inert material could be used for this purpose and the fertilizer was used in this case because it was convenient. Next, approximately 5 cc. of black ink 6 was placed in a water-tight, flexible, tissue-thin rubber sack, which was then tightly knotted confining the black ink 6 in the closed end of the rubber sack, and the excess of the rubber container was cut off above the knot.

The flexible, water-tight container 5 thus formed was then placed in the cavity of shell 1 immediately above the ballast 4 after which the crimped end of the shell, 7, was reclosed and the shell 1 loaded into a standard 12 ga. shotgun with a 28 inch barrel and modified choke. The gun, thus loaded, was then held with its muzzle approximately two feet from, and at right angles to the long axis of, a freshly cut elm branch, shown in FIGURE 3, and fired.

As shown in FIGURE 3, the elm branch 9, after being cut through the shot pattern, revealed that there had been a liquid penetration of the bark 12 as indicated by the shaded area 8 and the bark of the elm branch 9 was relatively unmarked.

As an example of how penetration of solid particles was achieved, referring to FIGURE 2, a second shotgun shell 1*a* of the same type and class as that used in the preceding example, was opened and the shot removed which was replaced with about 1½ oz. of approximately 10 mesh (sieve opening about 0.079 inch) standard NPK fertilizer as used in the example above, designated in FIGURE 2 by 10. The crimped end cap 7 was then closed and the shell 1*a*, thus loaded, was placed in the chamber of a standard 12 ga. shotgun with a 28 inch barrel and modified choke and fired at a maple branch 11 shown in FIGURE 4, at a range of about five feet, the axis of the gun barrel being approximately normal to the long axis of the maple branch, 11. As illustrated in FIGURE 4, the maple branch 11 was cut through the shot pattern revealing that the fertilizer charge 10 had penetrated the bark 12 and was distributed approximately as shown by the pattern 13. Although slightly scarred by the blast and the passage of the fertilizer particles, the bark 12 (FIGURE 4) was not seriously injured or damaged. Greater bark damage to trees which have been raked with small arms fire in the vicinity of rifle and pistol ranges has been observed by the inventor, said trees apparently undergoing no ill effects.

Obviously, the variations of this principle are limitless, but the examples set forth above clearly show that both liquid and solid particles may be introduced quickly and efficiently directly into the system of a botanical specimen without creating large areas of serious bark damage.

For young plants and trees of course, a lighter power charge and a shorter barrel, or longer range, would be in order to alter the degree of penetration and the effects of the muzzle blast. As is quite apparent, this invention also contemplates that high powered barrels in conjunction with heavy powder charges could be readily utilized to quickly force charges of fertilizer or medicaments directly through the earth and in to the roots below.

Too, compressed air could obviously serve the same purpose, the principle of this invention residing in the utilization of suddenly expanding gas to force solid or liquid nutrients, medicaments or poisons into plants without damaging the outer covering of the plant, or the plant itself, through the effects of the muzzle blast of the means used to direct the injection.

The inventor places no special importance on the particle size of the NPK fertilizer used for examples shown supra, the only requirement being that the charge to be injected should either be liquid, or particles of solid material fine enough to penetrate, depending upon the circumstances, without causing undue damage to either the interior or exterior of the plant to be treated.

A solid slug of the desired charge to be injected may be used if it is of such a brittleness that it will either (*a*) disintegrate into small particles by the explosive force applied at injection or (*b*) disintegrate under the impact of equipment which might later be used to process or shape the plant so injected, without harming said equipment.

Having thus described and illustrated my invention, it is set forth in the following claims which are to be construed in the light of the United States statutes and decisions to give them the broad range of equivalents to which they are entitled.

Materials for impregnation, as referred to throughout the specification, are not intended to include any botanically procreative materials, such as viable pollen, which would react reproductively with the specimen impregnated.

I claim:

1. The method of subsurface penetration and impregnation of a botanical specimen by explosively propelling a botanically procreatively inert and botanically non-toxic non-metal from a directional passage having a longitudinal axis, into and beneath the surface of said specimen comprising the steps of:

(*a*) generating a volume of fluid under pressure greater than atmospheric in a confined area, (*b*) imparting substantially unidirectional movement to said fluid by suddenly and explosively releasing same from said confined area into, through and out of an elongated directional passage having an open end, (*c*) ballistically propelling a botanically procreatively inert, and botanically non-toxic nonmetal with said moving fluid by entraining therein, within said passage, said nonmetal, and propelling said nonmetal through, and out said open end of said passage with a velocity sufficient to penetrate the surface of a botanical specimen, (*d*) penetrating, with said propelled nonmetal, the surface of a botanical specimen situated substantially in line with the emergent direction of said moving fluid and the therein entrained ballistically propelled non-metal.

2. The method of claim 1 wherein the nonmetal is a liquid.

References Cited in the file of this patent

UNITED STATES PATENTS

| | | |
|---|---|---|
| 1,278,216 | Reid | Sept. 10, 1918 |
| 1,575,716 | Pavek | Mar. 9, 1926 |
| 1,614,305 | Johnson | Jan. 11, 1927 |
| 1,878,489 | Goss | Sept. 20, 1932 |
| 1,999,458 | Hollister | Apr. 30, 1935 |
| 2,028,217 | Huffman | Jan. 21, 1936 |
| 2,193,664 | Balder | Mar. 12, 1940 |
| 2,570,511 | Blair | Oct. 19, 1951 |
| 2,612,000 | Anderson | Sept. 30, 1952 |
| 2,660,002 | Farley | Nov. 24, 1953 |
| 2,660,003 | Farley | Nov. 24, 1953 |

FOREIGN PATENTS

| | | |
|---|---|---|
| 23,902 | Australia | of 1925 |
| 10,699 | Australia | of 1913 |
| 422,275 | Italy | June 13, 1947 |

OTHER REFERENCES

"Fertilizers" (Voorhees), published by Macmillan (N.Y.), 1898, pages 16 and 17 relied on.

Organic Farmer (magazine), June 1953, vol. 4, No. 11, page 59, article "Bottle-Feed Your Pumpkins."

Chemical Abstracts (magazine), vol. 41, col. 6013(A), published 1947, article "Lead Arsenate for the Control of Crab Grass."

Condensed Chemical Dictionary, fifth edition, published by Reinhold (N.Y.) 1956, pages 12, 320, 400, 505, 846, 1075 are relied on.

Chandler: "Little-Leaf or Rosette of Fruit Trees, IV," published May 1935 in Proceedings of The American Society for Horticultural Science, for (year) 1934, vol. 32, pages 11 through 19.

Harrison: "Bullets From Zinc Alloys," published January 1948 in American Rifleman (magazine), vol 96, No. 1, pages 23 through 26.

Capek: "Zinc Alloys for Bullets," published August 1948 in American Rifleman (magazine) ,vol. 96, No. 8, pages 45 and 46.

Agricultural News Letter, May-June 1955 (published May 1955), vol. 23, No. 3, page 47, article, "Two New Aerosol Products for Lawn and Garden Care."